INVENTOR:
JOHN W. RYZNAR

DRYING

100°C ZONE

CARBONIZATION

1000°C ZONE

OXIDATION

500°C ZONE

REDUCTION

400°C ZONE

DRYING - CARBONIZATION - OXIDATION

REDUCTION

PRETREATMENT

CARBONIZATION

INVENTOR:
JOHN W. RYZNAR

United States Patent Office 2,870,000
Patented Jan. 20, 1959

2,870,000

FINELY DIVIDED METAL-CONTAINING SUBSTANCES AND PROCESS FOR THE PREPARATION THEREOF

John W. Ryznar, La Grange Park, Ill., assignor to National Aluminate Corporation, Chicago, Ill., a corporation of Delaware Application October 5, 1954, Serial No. 460,428

14 Claims. (Cl. 75—0.5)

This invention relates to a process of producing metal-containing substances of very fine particle size.

At the present time, finely divided metals and other metal-containing substances are prepared in several ways, principal among which are the mechanical reduction of large aggregates, or by chemical or electrical reduction to metal powders, of the metal oxide or other salt. These processes, however, possess inherent limitations as to the particle size reduction possible. In the chemical reduction of metal oxides, for example, the limiting factor is probably the original dimension of the starting oxide particle, while physical limitations are placed on the mechanical methods. One method which has been the most successful in obtaining metal powders of fine particle size is the dissociation of metallic carbonyls. In general, these methods produce few commercially available metal-containing substances of a particle size below one micron.

One of the objects of the present invention is to provide a new and useful process of producing metal-containing substances of very fine particle size.

Another object of this invention is to provide a process of producing very fine particles of free carbon, the particles containing a metal dispersed thereon.

A further object of the invention is to provide a process of producing metal-containing substances which are less than one micron in particle size.

Still another object of the invention is to provide a composition comprising a metal dispersed on very finely divided particles of carbon, said particles being similar in shape to the particles of a metal salt of a cation exchange resin but smaller in size.

Another object of the invention is to provide a new and useful process of producing metals, metal oxides, and metal sulfides in very finely divided form. Other objects of this invention will appear hereinafter.

In accordance with the invention, it has been found that by saturating a cation exchange resin with the desired metal, thermally decomposing or "carbonizing" the washed and dried metal salt of the resin in an inert atmosphere at a temperature sufficient to convert the resin to carbon, oxidizing the metal-bearing carbon with air or oxygen enriched atmosphere at an elevated temperature to produce the metal oxide, and then reducing the metal oxide at an elevated temperature with hydrogen, a very finely divided metal can be obtained.

Carbonization of the metallized resin in a neutral atmosphere does not result in a carbon ash, but instead results in the formation of free carbon particles with the metal remaining in a spatial arrangement similar to that which it occupied in the original compound. These carbon particles are hereinafter referred to as "carbon polymers" in that they consist of free carbon atoms so combined as to resemble the structure of the cation exchange resin from which they were derived.

In the drawings, Fig. 1 illustrates diagrammatically the steps by which various metal-containing substances in finely divided form can be obtained;

Figure 1:
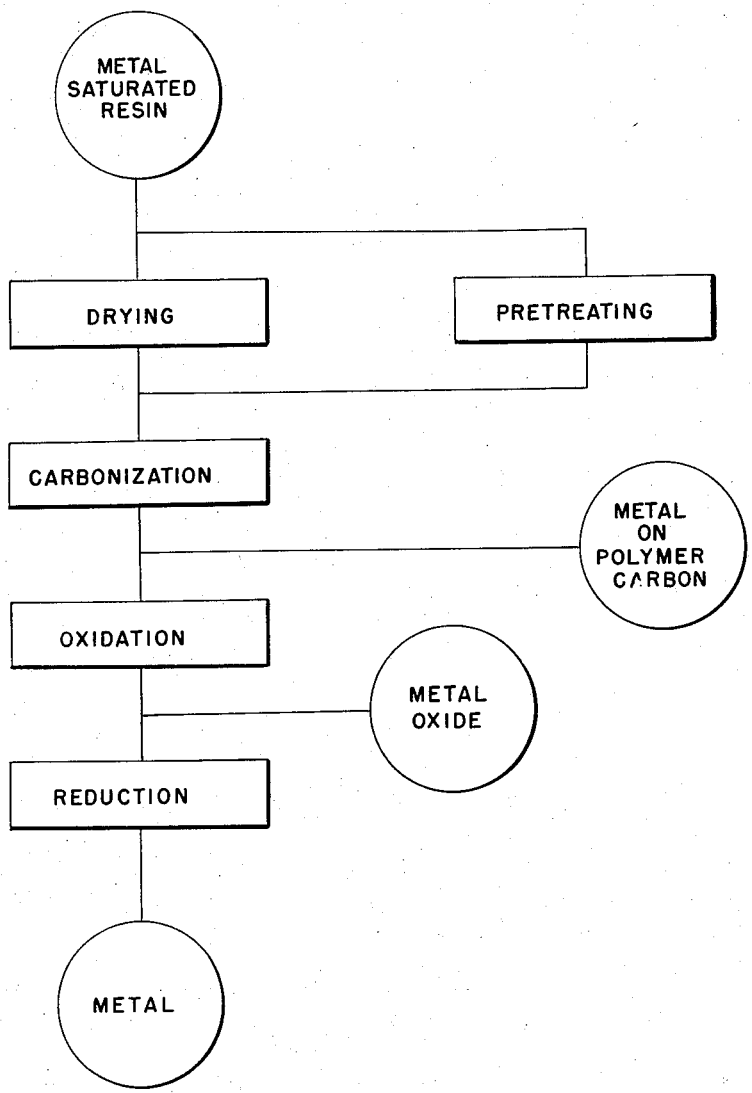

Referring to Fig. 1, it will be observed that the carbonization step is a very important feature of this invention. The step entitled "pretreating" is optional but important where it is desired to obtain the metal dispersed on polymer carbon. With the pretreatment to increase cross-linkage of the resin, carbonization in an inert atmosphere yields the metal dispersed on a polymer carbon. Without the pretreatment, but merely drying the metal saturated resin at a temperature sufficient to remove the water, it is possible to obtain the finely divided metals, metal oxides, metal sulfides, and other metal salts by the application of well known processes after carbonization has taken place. The oxidation step is required to remove the residual carbon from the metal-carbon residue, and yields the metal oxide in very finely divided form. The reduction of the metal oxide in a hydrogen atmosphere is then accomplished if the desired product is the very finely divided metal. The metal sulfides can be obtained by substituting a hydrogen sulfide atmosphere in the reduction step.

The metal salt of a cation exchange resin to be treated by the process herein disclosed is obtained by placing the resin in a water solution of a salt of the metal to be produced. The water solution can also contain a mixture of metal salts in order to obtain a mixed metal salt of the cation exchange resin from which a mixture of finely divided metals can be produced. After saturation of the resin with the metallic ions has taken place, the metallized resin is washed and dried in an oven at $100 \pm 10°$ C.

The cation exchange resins found most useful for the purposes of this invention are those which utilize carboxylic or sulfonic groups as the cation exchange groups and which exhibit cross-linkage of the carbon chain. These resins are well konwn in the art and have been fully described in the following U. S. patents: 2,340,110; 2,340,111; 2,611,730; 2,597,437; 2,597,438; 2,195,196; 2,228,159; 2,228,160; 2,366,007; and 2,597,492.

Either the sulfonic or carboxylic type resin can be used if the final product is the finely divided metal or metal oxide. However, the carboxylic type is preferred in the process since it appears that when the sulfonic type is used, some metal sulfides are formed which are more difficult to reduce, requiring a longer processing time. In addition, for some metals minor traces of sulfide remain in the final product. Therefore, for applications of making finely divided metals where the presence of traces of sulfur is deleterious, the carboxylic type of resin is preferred. If the final product is to be finely the divided metal dispersed on polymer carbon, it is desirable in the process as herein described to use resins which do not contain elements capable of forming thermally stable compounds with the metal. Thus, the sulfonic resins which yield, upon carbonization, a considerable amount of metal sulfide are not particularly suitable for producing metals dispersed on carbon without an additional step in the present process. They can, however, be used if an additional reduction step is used after carbonization. The sulfonic type resin is also advantageous in the production of finely divided metal sulfides.

The carboxylic cation exchange resins are insoluble polymeric substances which contain the —COOH group as the functional group thereof. These resins are obtained from carboxylic acids or their anhydrides, having an unsaturated linkage which permits them to enter into copolymers or heteropolymers with polymerizable substances including those which cause cross-linking. For example, maleic anhydride and styrene can be polymerized together and when there is present an unsaturated material having at least two non-conjugated double bonds, an insoluble resin results. The cross-linking material may be one such as divinylbenzene, ethylene diacrylate, diallyl maleate or fumarate or itaconate, or the like. Another source of carboxylic exchangers is based on the copolymerization of acrylic or methacrylic acid and a polyunsaturated polymerizable substance such as diallyl maleate or fumarate or itaconate, allyl acrylate, allyl methacrylate, diallyl ether, ethylene dimethacrylate, divinylbenzene, or the like. The copolymers or heteropolymers are formed in the conventional way with the aid of a catalyst, such as benzoyl peroxide, lauroyl peroxide, tert.-butyl perbenzoate, ter.-butylhydroperoxide, and the like. The resin when formed may be crushed to a fine powder. The insoluble carboxylic resins may also be formed by emulsion polymerization and then precipitated as fine particles. Acid anhydride groups are converted to carboxyl groups by treatment of resins with alkali or strong acid. If alkali is used, the resulting salt form of resin is readily converted to the acid form by washing with acid, e. g., hydrochloric acid.

Illustrative of the insoluble sulfonic type resins suitable for the purposes of this invention are copolymers of monovinyl aryl compounds and polyvinyl aryl compounds with the sulfonic group —$SO_3H$ in nuclear positions. Examples of the monovinyl aryl compounds are styrene, vinyl toluenes, vinyl naphthalenes, and the like. The polyvinyl aryl compounds provide the cross-linking material, and include such examples as divinylbenzenes, divinyltoluenes, divinyl naphthalenes, and the like. The copolymers are formed in the conventional way using suitable catalysts. After polymerization, the resin product is sulfonated by the use of known sulfonating agents such as concentrated sulfuric acid, fuming sulfuric acid, chlorosulfonic acid, etc., thereby adding the sulfonic groups in the nuclear positions. Various types of sulfonated cation exchange resins are well known in the art.

A neutral or inert atmosphere is advantageous during the carbonization step in order to prevent the metal dispersed on a carbon polymer from being oxidized. This neutral atmosphere is not required when products other than the metal dispersed on carbon polymer are desired, although its use in producing the metals and metal oxides generally contributes to a finer particle size. The neutral atmosphere as used in this invention is defined as an atmosphere which will not react with the substances treated in the carbonization step. While the carbonization may be carried out in vacuo, a nitrogen atmosphere has been found most suitable for this purpose, a high purity of nitrogen providing the best results.

It is apparent from the nature of the process that to obtain the pure metals in very finely divided form, they must be metals, a salt or oxide of which is reducible by hydrogen under appropriate temperature conditions, and which do not melt at the temperatures required by the process. The metal oxides can be obtained for that group of metals which do not melt below the temperature required for the pretreatment and the carbonization of the metal-bearing resin. Since there is no reduction step in producing the metal oxide, the metals produced need not be reducible by hydrogen. These limitations of the desired metals are readily understood by those skilled in the art when compared with the minimum temperatures required to carry out the process and the obvious necessity of a reduction by hydrogen to obtain the pure metal. Typical metals which are produced in the practice of this invention include iron, copper, nickel, cobalt, silver and platinum.

Figure 2:
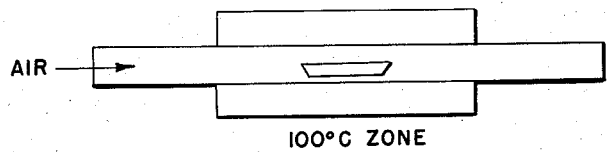
Fig. 2 illustrates preferred temperatures and various types of atmospheres used in the various steps of the process.
Figure 2:
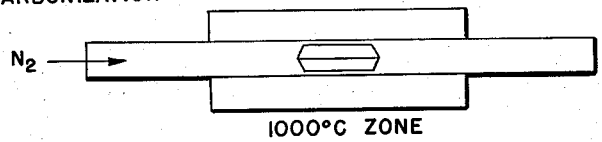
Figure 2:
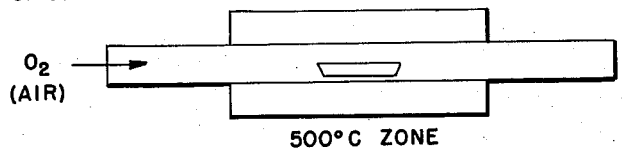
Figure 2:
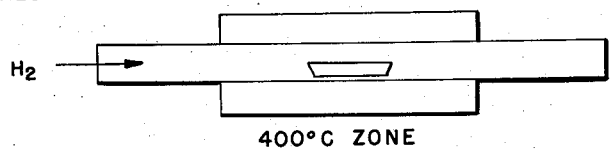

In Fig. 2, suitable temperatures for the various steps are indicated for typical metals, as hereinafter given in the examples. It is highly desirable to keep all temperatures at a minimum required to accomplish the purpose so as to prevent sintering and inhibit crystal growth to a larger particle size.

In order to obtain the metal dispersed on a carbon polymer, the metallized resin is preferably preheated at approximately 250° C. for at least 48 hours. The elimination of this step causes the carbon to go to an ash in the carbonization step, making it impossible to form a carbon polymer upon which the metal will be held. The preheating assures the highest possible cross-linkage in the resin.

Figure 3:
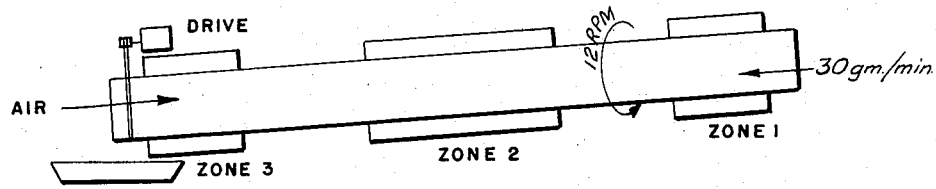
Fig. 3 illustrates diagrammatically the types of equipment which can be employed in making finely divided metals or metal oxides in accordance with the invention.
Figure 3:
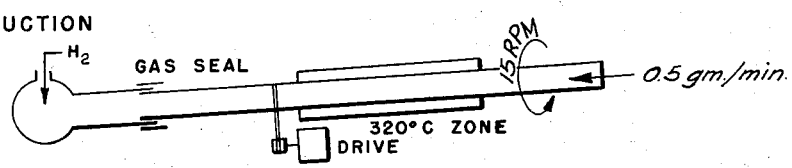

As shown in Fig. 3, the process of making finely divided metal or metal oxides can be made semi-continuous by carrying out the drying, carbonizing, and oxidizing in a single rotating tube furnace. Drying is accomplished in zone 1, carbonization in zone 2, and oxidation in zone 3. The oxidation may be completed in zone 3 or may be completed outside of the furnace after discharge if the discharge temperature is high enough to permit air oxidation. The air entering zone 3 may be enriched with oxygen if the oxidation proceeds slowly or with difficulty. The atmosphere in zone 2 is practically inert since most of the oxygen is removed in zone 3. The reduction step is preferably accomplished in a separate furnace into which hydrogen is introduced.

The rates of feed shown in Fig. 3 are typical for a small scale furnace. The feed rates are related to the metal being processed and to the temperature retained in the various zones. Reaction time can be regulated by increasing or decreasing the slope of the furnace.

The process and products are further illustrated but not limited by the following examples.

*Example 1*

The progressive steps in this example are presented schematically in Fig. 2.

One hundred grams of methacrylic divinylbenzene carboxylic resin obtained by the copolymerization of methacrylic acid and about 5% to 8% divinylbenzene (Amberlite IRC50), hydrogen form, were saturated with copper by placing the resin in a beaker with a solution of $CuCl_2$, and stirring. Saturation occurred quickly, after which the resin was washed with water and dried in an oven at 100°±10° C. It was determined that about 100 grams of resin absorbed the copper from about 70 ml. (milliliters) of a 0.5 M (molar) solution of $CuCl_2$.

For the carbonization, a sample of the above resin was weighed out in an Alundum boat which was then placed in a muffle furnace under a lower pressure stream of dry nitrogen. A second Alundum boat was used as a cover to prevent scattering of the product. Carbonization was found to be complete after 10 minutes at a temperature of 1000°±30° C. During this treatment the resin lost approximately 73% of its original weight.

In order to remove the residual carbon, the product of the above carbonization was heated slowly from room temperature to a dull red heat of about 500° C., producing a very light fluffy black material that was practically all copper oxide. The heating period was approximately 30 minutes, air under slight pressure being passed through the furnace to insure complete oxidation.

The reduction of the residual copper oxide was accomplished in the same muffle furnace used for the carbonization and oxidation steps. Hydrogen was introduced at a low pressure, the sample being placed in the furnace at a temperature of 400° C. to 450° C. for 30 minutes. After reduction, the material was cooled in a stream of nitrogen to prevent re-oxidation. The product has the familiar color of clean copper and reacts readily with dilute nitric acid, producing the usual copper color.

Example II

In another embodiment of this invention which is outlined in Fig. 3, 1000 grams of styrene divinylbenzene sulfonic resin (Nalcite HCR), which had been saturated with iron salts (e. g., $FeCl_3$) and washed but not dried, was slowly fed into the upper end of a rotating tube furnace approximately 30" long and 3½" inside diameter. The speed of rotation was approximately 12 revolutions per minute. The slope of the furnace was so adjusted that the rate of feed was approximately 30 grams of the resin per minute through the furnace. This furnace provided for both the drying and carbonizing of the resin and also caused the initiation of the oxidation step.

A limited supply of air was permitted to enter the lower end of the rotating tube countercurrent to the flow of the resin. Immediately after entering the furnace, the wet resin passed through a heated zone in which the water was driven out, the water vapor passing out the upper end of the tube countercurrent to the flow of the incoming resin. As the dried resin approached the center of the tube, it entered a second heating zone, the temperature of which was approximately 550° C. In this zone, carbonization took place in an atmosphere which was made effectively neutral by the oxidation of the resin as it passed into the next zone of the tube.

The final heating zone, at the lower end of the tube, initiated oxidation which served two functions: first, to generate the protective atmosphere for the immediately preceding step of carbonization, and secondly, to initiate oxidation which took place, to completion, after the residue left the rotating tube and was collected in a container which permitted limited access of air. The amount of air permitted to come into contact with the exit residue as it was being oxidized was limited to that amount which was necessary to maintain the reaction to completion without excessive heating. The average temperature of this material during the reaction was about 430° C., the reaction being complete in about four hours.

The 80 grams of residual iron oxide which was apparently high purity $Fe_2O_3$ was reduced by hydrogen in a similar type furnace. This furnace consists of a 1" diameter tube approximately 2 feet long rotating at a rate of about 15 revolutions per minute and is provided with a gas seal at the lower exit end which permits the maintenance of a reducing atmosphere within the furnace and also over the product as it emits from the lower end of the furnace. The iron oxide was fed at a rate of about ½ gram per minute through the rotating tube furnace, the temperature of which was 320° C. The product weighed 55 grams and was found by X-ray diffraction to be made up of particles of pure iron ranging from .02 to .05 micron.

Example III

In another embodiment of this invention in which the finely divided oxides are the desired product, the procedure is that of either Example I or Example II with the omission of the final reducing step. The products are metal oxides.

Example IV

Figure 4:
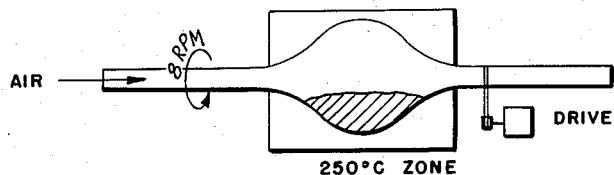
Fig. 4 diagrammatically illustrates one type of apparatus employed in producing a metal dispersed on polymer carbon.
Figure 4:
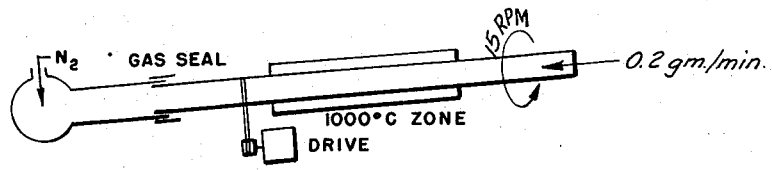

In still another embodiment of this invention, which is outlined in Fig. 4, the finely divided metal is produced on the polymer carbon resulting from the carbonization of the resin itself. To prepare this product, Example I above is extended in the following manner. The dried carboxylic resin which has been saturated with copper according to Example I above was pretreated by heating the resin in air at 250° C. for 48 to 72 hours. This was accomplished by placing a batch of the resin, say 100 grams, in a modified Pyrex flask of 500 ml. capacity. The flask is so modified that a slow stream of air may enter one side and exit from the other, while the whole is slowly rotated within an oven, the temperature of which is controlled at 250° C. At the completion of this pretreatment step, in which the resin lost approximately 6% of its weight and darkened to a deep brown color, the residue was carbonized, in a manner similar to that in Example II.

The product of this reaction is characterized by the fact that the carbon granules which contain the metal retain roughly the characteristics of the original resin particles in that they are the same spherical shape, although they have undergone a considerable loss in weight.

Example V

To obtain the finely divided metal sulfides, the procedure is that of Example I or Example II above, substituting a hydrogen sulfide atmosphere in the reduction step. The use of a sulfonic exchange resin is desirable since the products are metal sulfides.

Example VI

To obtain the finely divided mixed metal-containing substances, the procedure is that of the above examples except that the resin is initially saturated with a mixture of metals from a water solution containing metal salts (e. g., $CuCl_2$ and $FeCl_3$) dissolved in the desired proportions.

In a similar manner, the procedures of the foregoing examples are carried out by saturating the cation exchange material with aqueous solutions of soluble salts of metals, as for example, nickel chloride, cobaltous chloride, cobaltic chloride, silver nitrate, platinic chloride and/or salts of other metals, depending upon the desired product.

In general, the process as herein described requires a carbonization temperature which is sufficient to convert the resin to polymer carbon on which the metal, or its salt, remains distributed in a spatial arrangement similar to that which it occupied in the original compound. The oxidizing temperature is that which is sufficient to oxidize the carbon and the metal or metal salt (possibly sulfide), but is low enough to prevent sintering or any considerable crystal growth. The reducing temperature should also be kept as low as possible to prevent sintering or additional crystal growth. The order of magnitude of temperatures involved in these steps is indicated in Fig. 2.

The products obtained by this process are characterized chiefly by their finely divided state. For example, iron can be produced in particle sizes ranging from .02 to .04 micron. This is in contrast to the currently produced carbonyl iron which is said to range from 3 to 20 microns particle size. Thus, by comparison, the particle size reduction is of the order of 75–1,000 fold. It is also possible to produce equally finely divided metals such as copper, nickel, cobalt, and silver in the same manner. The metal oxides, sulfides, and other metal salts can also be obtained with a pronounced reduction in particle size.

The metal dispersed on carbon polymer is characterized not only by its finely divided form but also by its shape which retains a configuration similar to the cation exchange resin from which it is derived.

The metal-containing substances produced in accordance with this invention are particularly adapted to such uses as catalysts, phosphors and powder metallurgy. Applications in the electrical or electronic field are equally advantageous, such as in resin bonded transformer cores, printed circuits, or magnetic recording tapes.

The invention is hereby claimed as follows:

1. A process of producing a metal dispersed on finely divided carbon particles which comprises preheating a metal salt of a partially cross-linked cation exchange resin below its decomposition temperature at a temperature and for a period of time such that the resin salt does not disintegrate to an ash when carbonized, and then carbonizing said salt in an inert atmosphere.

2. A process of producing metal-containing substances which comprises drying a metal salt of an organic cation exchange resin below its decomposition temperature at a temperature and for a period of time such that the resin salt does not disintegrate to an ash when carbonized, and then carbonizing said metal salt to produce carbon containing the metal in a spatial arrangement similar to that which said metal occupied in the original metal salt of said cation exchange resin.

3. A process of producing iron-containing substances which comprises drying an iron salt of an organic cation exchange resin below its decomposition temperature at a temperature and for a period of time such that the resin salt does not disintegrate to an ash when carbonized, and then carbonizing said iron salt to produce carbon containing the iron in a spatial arrangement similar to that which said iron occupied in the original iron salt of said cation exchange resin.

4. A process of producing cobalt-containing substances which comprises drying a cobalt salt of an organic cation exchange resin below its decomposition temperature at a temperature and for a period of time such that the resin salts does not disintegrate to an ash when carbonized, and then carbonizing said cobalt salt to produce carbon containing the cobalt in a spatial arrangement similar to that which said cobalt occupied in the original cobalt salt of said cation exchange resin.

5. A process of producing nickel-containing substances which comprises drying a nickel salt of an organic cation exchange resin below its decomposition temperature at a temperature and for a period of time such that the resin salt does not disintegrate to an ash when carbonized, and then carbonizing said nickel salt to produce carbon containing the nickel in a spatial arrangement similar to that which said nickel occupied in the original nickel salt of said cation exchange resin.

6. A process of producing copper-containing substances which comprises drying a copper salt of an organic cation exchange resin below its decomposition temperature at a temperature and for a period of time such that the resin salt does not disintegrate to an ash when carbonized, and then carbonizing said copper salt to produce carbon containing the copper in a spatial arrangement similar to that which said copper occupied in the original copper salt of said cation exchange resin.

7. A process of producing silver-containing substances which comprises drying a silver salt of an organic cation exchange resin below its decomposition temperature at a temperature and for a period of time such that the resin salt does not disintegrate to an ash when carbonized, and then carbonizing said silver salt to produce carbon containing the silver in a spartial arrangement similar to that which said silver occupied in the original silver salt of said cation exchange resin.

8. A process of producing metal-containing substances which comprises drying a metal salt of an organic cation exchange resin below its decomposition temperature at a temperature and for a period of time such that the resin salt does not disintegrate to an ash when carbonized, said cation exchange resin having a cation exchange group from the class consisting of carboxyl groups and sulfonic groups, and then carbonizing said metal salt to produce carbon containing the metal in a spatial arrangement similar to that which said metal occupied in the original metal salt of said cation exchange resin.

9. A process of producing a substantially pure metal oxide in a very finely divided form which comprises drying a metal salt of an organic cation exchange resin below its decomposition temperature at a temperature and for a period of time such that the resin salt does not disintegrate to an ash when carbonized, then carbonizing said metal salt to produce carbon containing the metal in a spatial arrangement similar to that which said metal occupied in the original metal salt of said cation exchange resin, and oxidizing the resultant product to a metal oxide.

10. A process of producing a substantially pure metal in finely divided form which comprises drying a metal salt of an organic cation exchange resin below its decomposition temperature at a temperature and for a period of time such that the resin salt does not disintegrate to an ash when carbonized, then carbonizing said metal salt to produce carbon containing the metal in a spatial arrangement similar to that which said metal occupied in the original metal salt of said cation exchange resin, oxidizing the resultant product to a metal oxide, and reducing said metal oxide in a reducing atmosphere.

11. A process of producing a substantially pure metal sulfide in very finely divided form which comprises drying a metal salt of an organic cation exchange resin below its decomposition temperature at a temperature and for a period of time such that the resin salt does not disintegrate to an ash when carbonized, then carbonizing said metal salt to produce carbon containing the metal in a spatial arrangement similar to that which said metal occupied in the original metal salt of said cation exchange resin, oxidizing the resultant product to a metal oxide, and converting said metal oxide to a metal sulfide in the presence of a hydrogen sulfide atmosphere.

12. A process of producing a substantially pure metal in very finely divided form which comprises drying a salt of an organic cation exchange resin, of a metal which melts at a temperature higher than the decomposition temperature of said salt, below its decomposition temperature at a temperature and for a period of time such that the resin salt does not disintegrate to an ash when carbonized, then carbonizing said metal salt to produce carbon containing the metal in a spatial arrangement similar to that which said metal occupied in the original metal salt of said cation exchange resin, oxidizing the resultant product to a metal oxide, and converting said metal oxide to a metal in a hydrogen atmosphere.

13. A process of producing a mixture of substantially pure metals in very finely divided form which comprises drying a mixture of metal salts of an organic cation exchange resin below its decomposition temperature at a temperature and for a period of time such that the resin salt does not disintegrate to an ash when carbonized, then carbonizing said mixture of metal salts to produce carbon containing the metal in a spatial arrangement similar to that which said metal occupied in the original metal salts of said cation exchange resin, oxidizing the resultant product to a mixture of metal oxides, and reducing said metal oxides in a hydrogen atmosphere.

14. As a composition of matter, a metal-containing substance comprising fine particles of metal dispersed on a carbon polymer derived by drying a metal salt of an organic cation exchange resin below its decomposition temperature at a temperature and for a period of time such that the resin salt does not disintegrate to an ash when carbonized, and then carbonizing said metal salt to produce carbon containing the metal in a spatial arrangement similar to that which said metal occupied in the original metal salt of said cation exchange resin.

References Cited in the file of this patent

UNITED STATES PATENTS

| | | |
|---|---|---|
| 2,400,099 | Brubaker et al. | May 14, 1946 |
| 2,653,089 | Brooke | Sept. 22, 1953 |
| 2,691,814 | Tait | Oct. 19, 1954 |

OTHER REFERENCES

Ind. Eng. Chem., 37, 623, 624 (1945).